A. L. KRONQUEST & C. BULOT.
SOLDERING MACHINE.
APPLICATION FILED AUG. 22, 1912.
1,192,646.
Patented July 25, 1916.
3 SHEETS—SHEET 1.
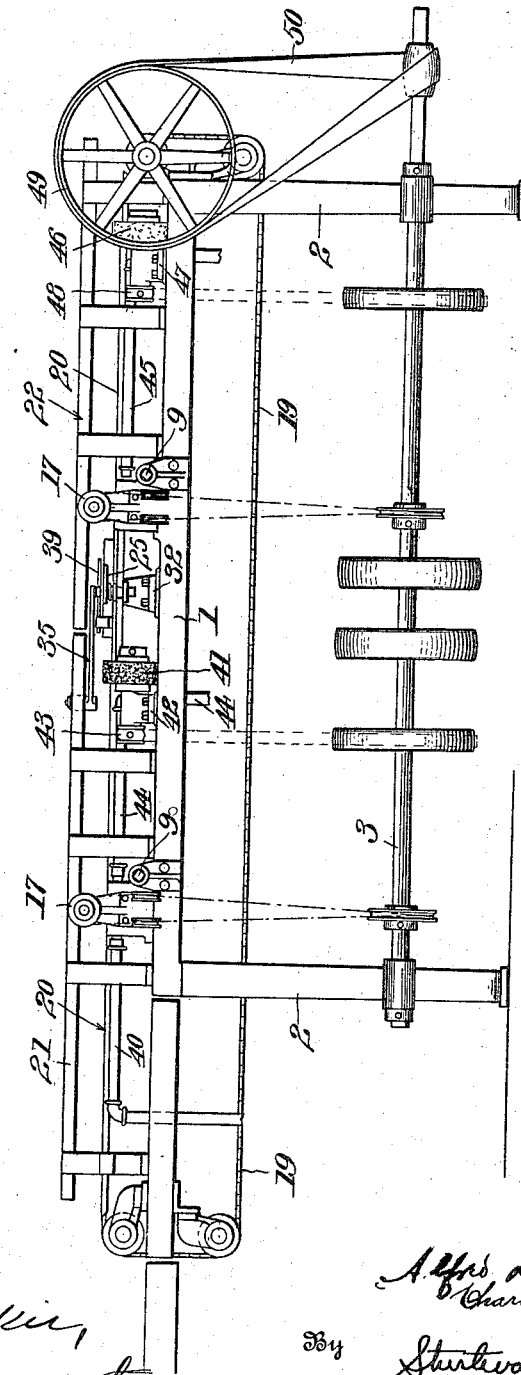
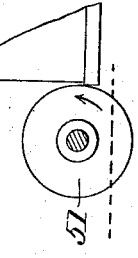
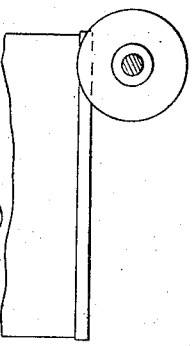
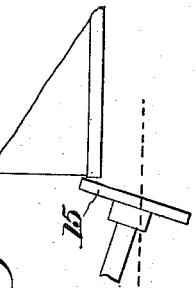
Witnesses
Inventor
Alfred L. Kronquest
Charles Bulot
By Sturtevant & Mason
Attorneys

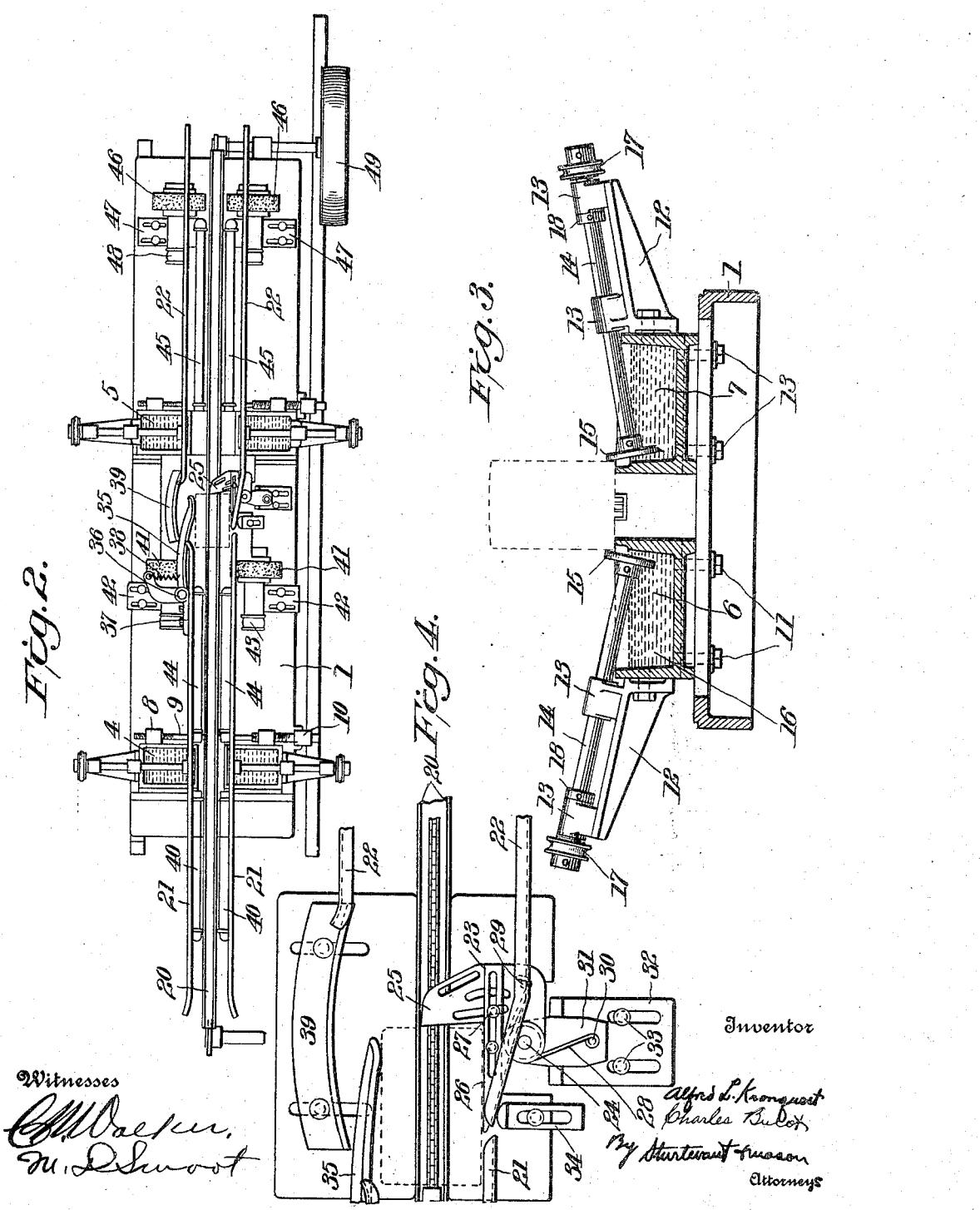

A. L. KRONQUEST & C. BULOT.
SOLDERING MACHINE.
APPLICATION FILED AUG. 22, 1912.

1,192,646.

Patented July 25, 1916.
3 SHEETS—SHEET 3.

UNITED STATES PATENT OFFICE.

ALFRED L. KRONQUEST AND CHARLES BULOT, OF CHICAGO, ILLINOIS, ASSIGNORS, BY MESNE ASSIGNMENTS, TO CONTINENTAL CAN COMPANY, INC., A CORPORATION OF NEW YORK.

SOLDERING-MACHINE.

1,192,646.  Specification of Letters Patent.  Patented July 25, 1916.

Application filed August 22, 1912. Serial No. 716,490.

*To all whom it may concern:*

Be it known that we, ALFRED L. KRONQUEST and CHARLES BULOT, citizens of the United States, residing at Chicago, in the county of Cook, State of Illinois, have invented certain new and useful Improvements in Soldering-Machines, of which the following is a description, reference being had to the accompanying drawing and to the figures of reference marked thereon.

The invention relates to new and useful improvements in soldering machines, and more especially to machines adapted for applying solder to square cans.

An object of the invention is to provide a machine of the above character wherein the opposite seams joining the bottom to the body of the can may be simultaneously soldered.

A further object of the invention is to provide a combination of devices whereby the opposite seams joining the bottom to the body of a square can may be simultaneously soldered, after which the can may be turned and the two remaining opposite seams simultaneously soldered.

A further object of the invention is to provide a device of the above character with means for preheating the seams which are to be soldered, and means for wiping the surplus solder from the seam after the soldering operation.

These and other objects will in part be obvious and will in part be hereinafter more fully disclosed.

Figure 5:
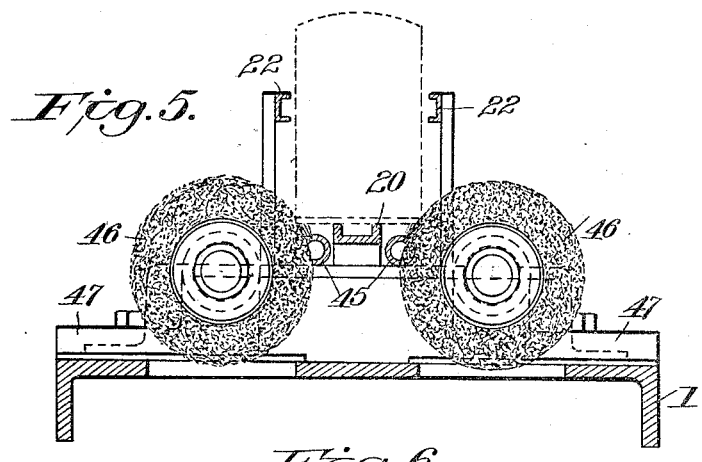
Figure 6:
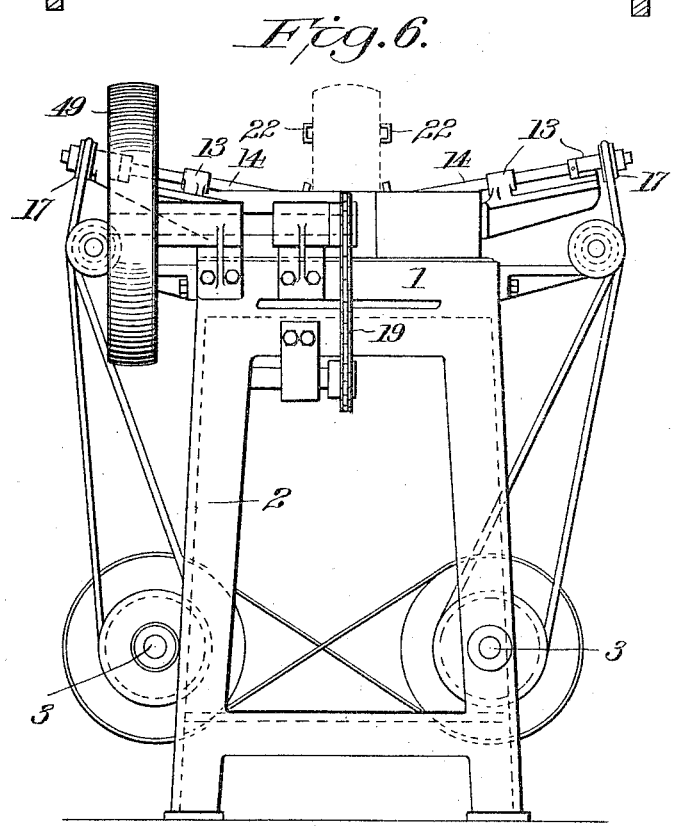

In the drawings which show by way of illustration one embodiment of the invention, Figure 1 is a side view of a soldering machine embodying our improvements; Fig. 2 is a plan view of the same; Fig. 3 is a transverse sectional view through the soldering trough, showing the devices for applying the solder to the can; Fig. 4 is an enlarged detail showing in plan devices for turning the can; Fig. 5 is an enlarged transverse sectional view, showing the wipers in side elevation; Fig. 6 is an end view of the machine; Fig. 7 is an enlarged view, showing the relation of the solder-applying device to the end seam for joining the bottom to the side of the can; Fig. 8 is a similar view, showing the solder-applying device in side elevation; Fig. 9 is a view similar to Fig. 7, showing a slightly modified form of solder-applying device; and Fig. 10 is a view similar to Fig. 8, showing a modified form of solder-applying device.

The invention consists generally in a soldering machine which is composed of a plurality of solder-applying stations, each of which is provided with a pair of solder-applying devices. Intermediate these solder-applying stations is a turning device for turning a square can, so that the can may be presented first to one seaming station wherein solder is simultaneously applied to the opposite end seams, after which the can is given a quarter turn and presented to the other pair of soldering devices, wherein the other opposite end seams are supplied with solder.

The device further consists of means for preheating the seams which are to be soldered, and also devices for wiping the surplus solder from the seams.

Referring more in detail to the drawings, the invention consists of a table 1, which is mounted on suitable supporting standings 2, 2. A driving shaft 3 is journaled at each side of the table in the standards, and may be driven from any suitable source. Mounted on the table, as herein shown, are two solder-applying stations 4 and 5. Each station consists of two solder-holding troughs 6 and 7, which are bolted to the supporting table. In order that these troughs may be adjusted transversely of the table, we have provided each trough with a perforated threaded lug 8, which receives a threaded bolt 9, and the threaded bolt 9 is held from endwise movement in a perforated lug 10 carried by the table.

It will be apparent from Fig. 2 of the drawing that the bolt extends entirely across the table, and engages both the solder troughs at a seaming station. The bolt is provided with right and left hand threads, so that when it is turned the two troughs are simultaneously moved toward or from each other. The trough is held in adjusted position by bolts 11, which pass through slots in the table. Mounted on each trough is a laterally extending bracket arm 12, which is provided with two spaced bearings 13, 13, in which is mounted a short shaft 14. These bearings 13, 13, are so positioned that the shaft 14 stands at an angle to the horizontal. At the lower end of the shaft 14 is a disk 15, which is made of suitable metal, and serves as a solder-applying device. The trough is adapted to receive solder 16, which is kept in molten condition by suitable heating devices. The disk 15 is so positioned as to extend for a greater part of its diameter beneath the surface of the molten solder. On the outer end of the shaft 14 is a pulley 17. A stop collar 18 is attached to the shaft 14, and the pulley 17 is also secured to the shaft 14, and serves as a limiting stop to limit the endwise movement of the shaft 14 through the bearings 13. In other words, the collar 18 is spaced from the side face of the pulley 17, or the collar carried thereby a greater distance than the width of the bearing 13, so that the shaft 14 has a slight endwise play in the bearings 13. The constructions of the several solder-receiving troughs, the supporting bracket arms carried thereby, and the soldering devices, are similar, and the above description is understood to apply to each of these devices.

The can to be soldered is carried to the soldering devices by a conveyer belt 19, of the usual type. The cans rest on guide rails 20, which are spaced so as to allow the endless carrier 19 to pass between the same. These guide rails 20 are preferably formed by a U-shaped bar and the conveyer travels between the rails on the bar. The side guide rails 21, 21, are also provided to hold the can in upright position as it slides along the guide rails 20. The guide rails 20 extend from one end of the machine to the other, while the guide rails 21 extend only partially through the machine.

The cans are delivered on to the guide rails 20 at the receiving end of the machine in any suitable way, and will be taken along by the conveyer first to one soldering station and then to the other. The side guide rails 22 for the can as it passes through the second soldering station, are spaced farther apart as shown in the drawings, so the can may be given a quarter turn and thereby an oblong can soldered. The guiding rails may be adjusted toward and from one another in any desired way.

Between the seaming stations the can is given a quarter turn by a turning device which consists of a swinging bracket 23, pivoted at 24 to a supporting plate carried by the table. Said bracket 23 is formed with an outwardly projecting nose 25, and a lateral extension 26, the inner surfaces of which are substantially at right angles to each other. The extension 26 is adjustably secured to the swinging bracket 23 by suitable bolts 27. This swinging bracket 23 is mounted so as to swing underneath the guide rail 22. A spring 28 is coiled about the pivotal support for the swinging bracket, and one end of said spring engages a pin 29 carried by the bracket, while the other end of said spring engages a pin 30 carried by a supporting plate 31, to which the swinging bracket is pivoted. This supporting plate 31 is carried by an adjustable angle bracket 32, which is held in adjusted position by suitable bolts 33, which pass through the slotted base of the bracket and are secured to the supporting table 1.

An adjustable stop 34 limits the movement of the swinging bracket 23. At the opposite side of the machine from the swinging bracket is an arm 35, which is pivoted at 36 to a bracket 37, bolted to the side rail 21. A spring 38 is secured at one end to a projection carried by the arm 35, and at its other end to the rail, and normally presses the arm 35 toward the swinging bracket 23. The guide rails 21 and 22 at a point adjacent the swinging arm 35, are spaced and formed with outturned ends. A curved guide rail 39 extends between the ends of the guide rails 21 and 22. The can as it passes along the rails 20 will be carried against the nose 25 of the swinging bracket 23, and the bracket will swing about its pivotal support. The spring arm 35 will hold the can firmly against the extension 26, and as the bracket turns the can will be gradually given a quarter turn with the bracket. The curved guide rail 39 also assists in holding the can against the swinging bracket. As soon as the swinging bracket has turned through an arc of 90°, the can body is given a quarter turn, and the conveyer will carry said can body from the swinging bracket. When the swinging bracket is turned, as above noted, the inner face of the nose 25 of the bracket will then be parallel with the guide rails 20, while the extension 26 will extend at right angles thereto. As soon as the can is conveyed from the swinging bracket, the spring 28 will at once return the bracket to its normal position with the extension resting against the stop 34.

In order that the cans may be perheated and prepared for soldering, we have provided pipes 40, which extend along the rails 20. These pipes 40 are perforated and are adapted to throw a flame directly against the seam which is to be soldered, so that as the can travels along the rail 20, the end seams will be prepared to receive the solder. It is obvious that other preheating devices may be utilized, instead of that herein referred to. After the cans leave the first seaming station, they are conveyed to the wiping devices 41, which, as herein shown, consist of rotating felted rollers, each of which is mounted on a short shaft carried by brackets 42.

The shaft supporting the wiping roller is driven by a pulley 43 from a suitable belt connection with the main shaft beneath the table. The cans after leaving the first soldering station are kept in heated condition by heating pipes 44. After leaving the second seaming station, the cans are also heated by pipes 45, and the surplus solder, while still in heated condition, is wiped from the end seam by wipers 46, which are similar to the wipers 41 above referred to. These wiping rolls 46 are carried by brackets 47, which may be adjusted transversely of the table, and are driven by pulleys 48 from a suitable belt connection with the main shaft. The endless carrier 19 is driven from a pulley wheel 49, at the end of the table, which is also operated from the main shaft by a suitable belt connection 50.

In the operation of our device, a rectangular can is fed in vertical position on to the rails 20, and the endless conveyer engages the can and carries it along said rails. The side rails 21 serve to hold the can in said vertical position. As the can arrives at the first soldering station, the rotating disks 15 which are carried by the shafts 14 are caused to separate slightly, moving the shafts 14 endwise in their bearings, so that the disks will be held by gravity pressed against the end seams of the can. As these disks rotate, the solder will be carried from the trough and applied to the seam. The disks 15 are rotating continuously, and the can is caused to travel along the same. It will be apparent, therefore, that each of the end seams on opposite sides of the can will be simultaneously supplied with solder, while the can is in vertical position. This supplying of the can with solder while in vertical position and while the seam to be soldered is heated, allows the solder to sweat into the end seam and to perfectly close the same.

As the disks 15 pass from the seams, the solder will be caused to flow around the corners, so that when the can is presented to the next seaming station, there will be no break in the soldered seam. After passing the first seaming station, the can is received by the swinging bracket or turning device, and the force of the conveyer causes the bracket to swing and give the can a quarter turn, after which the can in its turned position is carried along the guide rails 20 to the second seaming station. Here likewise, the soldering disks are separated slightly, and held by gravity pressed against the seam to be soldered. The rotating of these soldering devices supplies the molten solder to the seam precisely as above noted. After the can passes the second seaming station, it is carried along the guide rails to the wiping devices therefor. The wiping devices 41 operate upon the first soldered seams, while still in heated condition, and remove the surplus solder therefrom; while the second wiping devices 46 operate upon the last named soldered seams while still heated and remove the surplus solder therefrom.

It will be apparent from the above description, that we have provided a soldering machine wherein square cans may have their opposite end seams simultaneously soldered while the cans are in vertical position, which is the most advantageous position for soldering, after which the surplus solder is removed from the side seams, the can turned through 90° and the opposite end seams soldered and wiped.

While we have described a construction wherein the solder-applying devices are held by gravity against the end seams, it will be obvious that other means may be provided for forcing the soldering devices into contact with the seams. This forcing of the soldering device against the seam by gravity causes the soldering device to maintain contact with the seam to be soldered, regardless of any inequalities in the shaping of the cans, any roughness in the surface being soldered, or other irregularities which would cause the distance between the surfaces being soldered to vary.

The machine may be readily adjusted to adapt it for different sized cans, by adjusting the soldering troughs and the guide rails transversely of the table; also by moving the wiping devices transversely to the table and adjusting the turning device. Instead of using a disk which rotates in a plane substantially parallel to the path of travel of the can, we may use a rotating disk arranged at right angles thereto, as clearly shown in Figs. 9 and 10. In these figures, the soldering disks 51 are mounted so as to rotate in a plane at right angles to the plane of the seam, and said disks are preferably rotated in the direction of the arrow, so as to lift the solder from the solder bath and apply the same to the end seam.

It is obvious that minor changes in the details of construction and arrangement of parts may be made, without departing from the spirit of the invention, as set forth in the appended claims.

Having thus described our invention, what we claim as new and desire to secure by Letters Patent, is:—

1. A machine for soldering the bottoms on square cans including soldering stations, each of which includes yielding spaced soldering devices disposed on opposite sides of the cans, means for supplying said devices with solder, means for presenting a square can first to one soldering station and then to the other and giving said can a quarter turn between the soldering stations, whereby two opposite end seams are simultaneously soldered at one station and the other two opposite end seams are simultaneously soldered at the other station.

2. A machine for soldering the bottoms on square cans including soldering stations, each of which includes yielding spaced soldering disks disposed on opposite sides of the cans, means for supplying said disks with molten solder, means for rotating said disks, means for presenting a square can first to one seaming station and then to the other and giving said can a quarter turn between the seaming stations, whereby two opposite end seams are simultaneously soldered at one station and the other two opposite end seams are simultaneously soldered at the other station.

3. A machine for soldering the bottoms on square cans including spaced soldering devices for simultaneously soldering the opposite end seams on the same end of the can, means whereby said soldering devices are yieldingly pressed against the seams, and means for moving said can in contact with said soldering devices.

4. A machine for soldering the bottoms on square cans including spaced soldering devices for simultaneously soldering the opposite end seams on the same end of the can, means whereby said soldering devices are yieldingly pressed against the seams, means for moving said can in contact with said soldering devices, and means for wiping the surplus solder from said soldered seams.

5. A machine for soldering the bottoms on square cans including spaced soldering disks, means for supplying molten solder to said disks, means for rotating the disks, means for moving a can with the opposite end seams on the same end of the can in contact with said disks, means for causing said disks to yieldingly press the end seams, and means for wiping the surplus solder from said end seams.

6. A machine for soldering the bottoms on square cans including a plurality of soldering stations, each of which includes spaced soldering disks, means for supplying molten solder to said disks, means for presenting two opposite end seams on the same end of the can to the soldering disks of one station, turning the can and presenting the two other end seams to the other station, and means for wiping the surplus solder from said end seams.

In testimony whereof, we affix our signatures in the presence of two witnesses.

ALFRED L. KRONQUEST.
CHARLES BULOT.

Witnesses:
W. SCHARMER,
AGNES M. GOODWIN.

Copies of this patent may be obtained for five cents each, by addressing the "Commissioner of Patents, Washington, D. C."